United States Patent [19]

Plant

[11] Patent Number: 4,468,040
[45] Date of Patent: Aug. 28, 1984

[54] SPACER-EXPANDER FOR PISTONS
[75] Inventor: Robert Plant, Bradford, England
[73] Assignee: AE PLC, Rugby, England
[21] Appl. No.: 449,204
[22] Filed: Dec. 13, 1982
[30] Foreign Application Priority Data
Dec. 17, 1981 [GB] United Kingdom ................ 8138087
[51] Int. Cl.$^3$ ................................................ F16J 9/06
[52] U.S. Cl. .................................................. 277/140
[58] Field of Search ...................... 277/140, 139, 138
[56] References Cited
U.S. PATENT DOCUMENTS
3,580,589 5/1971 Prasse ................................. 277/140
4,053,165 10/1977 Hartley ............................... 277/140

Primary Examiner—Robert I. Smith
Attorney, Agent, or Firm—Leydig, Voit, Osann, Mayer & Holt, Ltd.

[57] ABSTRACT

An annular spacer-expander spaces and positions two rails in a piston ring groove of a piston for an internal combustion engine. The spacer-expander comprises a plurality of U-shaped members which lie in respective angularly spaced planes including the spacer-expander axis and whose arms open inwardly of the spacer-expander for urging radially inner ends of respective rails into contact with respective radial walls of the piston ring groove. The U-shaped members are interlinked in serpentine fashion to give the spacer-expander circumferential resilience. The ends of the U-shaped members are bent outwardly for urging the rails into contact with an associated cylinder or liner. A plurality of rail spacer lugs are provided for controlling axial movement of the radially outer ends of the rails. Each ring spacer lug is located between a pair of adjacent U-shaped members and is connected to that portion of one of the pair which forms the base of the U.

4 Claims, 2 Drawing Figures

4,468,040

SPACER-EXPANDER FOR PISTONS

BACKGROUND TO THE INVENTION

The invention relates to spacer-expanders for spacing and positioning two oil control rails in a piston ring groove of a piston for an internal combustion engine.

When a piston of an internal combustion engine or compressor is reciprocating within an associated cylinder it is essential that a lubricant such as oil is provided between the piston and piston rings and the cylinder. The consumption of lubricant is increased, however, if the lubricant is, for example, allowed to reach the combustion chamber. For this reason it has become customary to provide a scraper ring located in a piston ring groove and extending around the piston. Such a ring includes two rails which engage the associated cylinder wall and remove lubricant from the cylinder wall to prevent the passage of lubricant past the rails to the combustion chamber.

To operate successfully it is necessary that the rails of the ring are urged both towards the cylinder wall, to seal against the cylinder wall, and towards radially extending walls of the piston ring groove, to prevent lubricant seeping around the groove and the rails. It is also desirable that the rails are not permitted to flex unduly in a radialy direction as a result of the forces generated by the sliding contact between the ring or rings and the cylinder wall.

SUMMARY OF THE INVENTION

According to the invention, there is provided an annular spacer-expander for spacing and positioning two rails in a piston ring groove of a piston for an internal combustion engine and comprising a plurality of U-shaped members which lie in respective angularly spaced planes including the spacer-expander axis, whose arms open inwardly of the spacer-expander for urging radially inner ends of respective rails into contact with respective radial walls of the piston ring groove, which are interlinked in serpentine fashion with the arms of successive pairs of U-shaped members being interconnected on alternately opposite sides of a plane normal to the spacer-expander axis and passing through the bases of the U-shaped members to give the spacer-expander circumferential resilience, and whose ends are bent outwardly for urging the rails into contact with an associated cylinder or liner, and also comprising a plurality of ring spacer lugs for controlling axial movement of radially outer ends of the rails, each ring spacer lug being between a pair of adjacent U-shaped members and being connected to the base of one of the pair of U-shaped members.

BRIEF DESCRIPTION OF THE DRAWINGS

The following is a more detailed description of one embodiment of the invention, by way of example, reference being made to the accompanying drawings in which.

DESCRIPTION OF THE PREFERRED EMBODIMENTS

Figure 2:
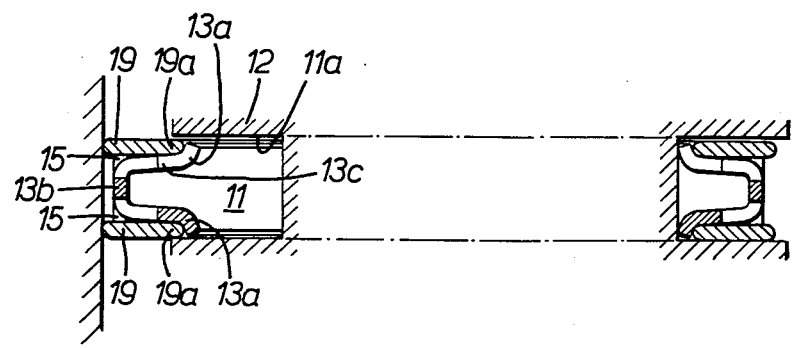
FIG. 2 is a section through the spacer-expander of FIG. 1 located in a piston ring groove together with two rails which engage a cylinder wall.

The spacer-expander 10 is annular in shape for insertion into a piston ring groove 11 of a piston 12. The spacer-expander 10 is formed by a plurality of U-shaped members 13 which, as best seen in FIG. 2, lie in respective angularly spaced planes including the spacer-expander axis. The members 13 are tipped on one side so that they open inwardly of the spacer-expander 10, as also best seen in FIG. 2.

Figure 1:
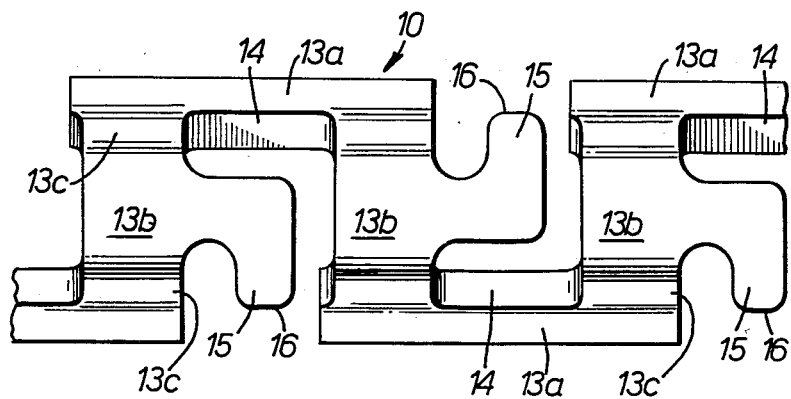
FIG. 1 is an elevation of a segment of an annular spacer-expander for insertion into a piston ring groove of a piston for an internal combustion engine or a compressor.

The U-shaped members 13 are interlinked in serpentine fashion (see FIG. 1) so that the ends 13a of the arms of successive pairs of members 13 are interconnected, by connections 14, on alternately opposite sides of a plane normal to the spacer-expander axis and passing through the bases of the members 13. As seen in FIG. 2, these ends 13a are bent outwardly of the remainder of the U-shaped members 13. The gap between each pair of U-shaped members 13 is greater than the circumferential width of each U-shaped member 13.

A rail spacer lug 15 is located in the gap between each adjacent pair of U-shaped members 13. The lugs 15 face in alternately opposite directions (see FIG. 1) and are connected to that portion of the associated U-shaped member which forms the base 13b of the U. The direction in which each lug 15 faces is chosen so that the lug 15 lies on the same side of the plane normal to the spacer-expander axis as the unconnected ends of the adjacent U-shaped members. Each lug 15 has an abutment surface 16 located axially beyond the ends of the U-shaped members 13, as seen in FIG. 2.

The spacer-expander 10 is manufactured from a flat strip of metal. A punch (not shown) is used to stamp out pieces from alternate sides of the strip with the pieces being so shaped as to form the U-shaped members 13 and the lugs in flattened form. The strip is then bent to form the U-shaped members 13 and to bend outwardly their ends. The bent strip is then formed into an annulus of required diameter. It will be appreciated that since the lugs 15 face towards the unconnected ends of the associated U-shaped members, the punch can be of simple shape and the stamping operation performed quickly and easily.

In use, the spacer-expander 10 is inserted into the piston ring groove 11 of a piston of, for example, an internal combustion engine (not shown). Two rails 19 are then inserted into the groove 11 so that each rail 19 has a radially inner end 19a between one set of arms 13c of the U-shaped members 13 and a radially extending wall 11a of the groove 11. In addition, the radially innermost end 19a of each rail 19 bears against the associated outwardly bent ends 13a of the members 13. The rails 19 are located so that they bear against a cylinder wall 20.

The arrangement is such that the U-shaped members 13a have their arms 13c slightly inwardly flexed towards one another by the rails 19. This ensures that the radially inward ends 19a of the rails 19 are urged against the groove walls 11a to prevent the passage of lubricant into the groove 11 (in the case of the lower rail 19) and from the groove 11 into the combustion chamber (in the case of the upper rail 19). The diameter of the spacer-expander is such that the outwardly turned ends 13a of the members urge the rails 19 into contact with an associated cylinder or liner and tend to keep the rails 19 concentric with the piston and cylinder axes. This resilience is achieved, at least in part, by the serpentine shape of the spacer-expander 10. This allows the spacer-expander to expand and contract in a circumferential direction rather in the manner of a coil spring bent into an annulus.

The lugs 15 control the axial movement of the radially outer ends 19b of the rails 19 as they move up and down the cylinder wall 20. They also prevent undue flexing of the rails 19 in a radial direction.

It will be appreciated that a luge 15 need not be provided between each pair of U-shaped members 13; they may be provided between alternate pairs of U-shaped members 13 or in any other convenient arrangement.

I claim:

1. An annular spacer-expander for spacing and positioning two rails in a piston ring groove of a piston for an internal combustion engine and comprising a plurality of U-shaped members which lie in respective angularly spaced planes including the spacer-expander axis, whose arms open inwardly of the spacer-expander for urging radially inner ends of respective rails into contact with respective radial walls of the piston ring groove, which are interlinked in serpentine fashion with the arms of successive pairs of U-shaped members being interconnected on alternately opposite sides of a plane noraml to the spacer-expander axis and passing through the bases of the U-shaped members to give the spacer-expander circumferential resilience, and whose ends are bent outwardly for urging the rails into contact with an associated cylinder or liner, and also comprising a plurality of ring spacer lugs for controlling axial movement of radially outer ends of the rails, each ring spacer lug being between a pair of adjacent U-shaped members and being connected to the base of one of the pair of U-shaped members.

2. A spacer-expander according to claim 1 wherein a lug is provided between each pair of spacer expander members and wherein the lugs are alternately oppositely directed so that the lugs of one direction provide a limit for axial movement of one of the rails while the lugs of the opposite direction provide a limit for axial movement of the other of the rails.

3. A spacer-expander according to claim 2, wherein each lug lies on the same side of the plane normal to the spacer-expander axis and passing through the bases of the U-shaped members as the unconnected ends of the adjacent U-shaped members.

4. A spacer-expander according to claim 1, wherein adjacent U-shaped members are circumferentially spaced by a distance which is greater than the circumferential width of each U-shaped member.

* * * * *